United States Patent
Liu et al.

(10) Patent No.: US 9,349,171 B2
(45) Date of Patent: May 24, 2016

(54) STATISTICAL PROPERTY PRESERVED BAD LINE CORRECTION

(71) Applicant: General Electric Company, Schenectady, NY (US)

(72) Inventors: James Zhengshe Liu, Salt Lake City, UT (US); Richard Larry Anderton, West Jordan, UT (US); James Blake, Layton, UT (US); Sung Kwan Pyun, Salt Lake City, UT (US); Alexander Meyer, Cottonwood Heights, UT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 204 days.

(21) Appl. No.: 14/082,768

(22) Filed: Nov. 18, 2013

(65) Prior Publication Data

US 2015/0139522 A1 May 21, 2015

(51) Int. Cl.
*G06K 9/00* (2006.01)
*G06T 5/20* (2006.01)
*G06T 5/00* (2006.01)

(52) U.S. Cl.
CPC . *G06T 5/20* (2013.01); *G06T 5/005* (2013.01); *G06T 2207/10116* (2013.01); *G06T 2207/20012* (2013.01)

(58) Field of Classification Search
CPC .................. G06T 2207/10116; G06T 5/10
See application file for complete search history.

(56) References Cited

U.S. PATENT DOCUMENTS

| 6,737,625 | B2 * | 5/2004 | Baharav et al. ............ 250/208.1 |
| 7,102,673 | B2 * | 9/2006 | Kimura ........................ 348/246 |
| 7,627,193 | B2 * | 12/2009 | Alon .................. G02B 27/0012 348/240.3 |
| 8,855,265 | B2 * | 10/2014 | Engel et al. ...................... 378/62 |
| 2003/0043967 | A1 * | 3/2003 | Aufrichtig et al. ............ 378/207 |
| 2011/0057802 | A1 * | 3/2011 | Topfer et al. .................. 340/584 |

\* cited by examiner

*Primary Examiner* — Shefali Goradia
(74) *Attorney, Agent, or Firm* — McAndrews, Held & Malloy, Ltd.; William Baxter

(57) ABSTRACT

The present disclosure presents systems and methods for correcting image artifacts on an x-ray image. X-ray images are obtained and processed with a correction algorithm that generates corrected pixel lines having pixels with corrected pixel values. The corrected pixel lines can then be processed with a filtering algorithm that generates filtered pixel line having pixels with a filtered pixel value. The bad pixel lines are replaced by the filtered pixel lines to generate corrected x-ray images.

18 Claims, 6 Drawing Sheets

STATISTICAL PROPERTY PRESERVED BAD LINE CORRECTION

CROSS REFERENCE TO RELATED APPLICATIONS

[Not Applicable]

BACKGROUND OF THE INVENTION

Digital x-ray systems can occasionally generate artifacts that appear on x-ray images. The artifacts can be pixels or collections of pixels that have pixel values (i.e., brightness/darkness levels of the pixel) that do not properly reflect the object being imaged. The artifacts can be caused, for example, by panel defects in the imaging device or x-ray detector (e.g., a flat panel x-ray detector), or as an effect of the x-ray detector equipment, such as the butting gaps of multi-wafer tiling. In this manner, the artifacts can appear as a "bad line" of pixels that have a pixel value generally darker or lighter than the surrounding pixels. The bad lines can inhibit the clarity and viewability of the x-ray image. For example, FIG. 1 shows an exemplary x-ray image having vertical bad pixel line 10, and multiple horizontal bad pixel lines 20.

Bad lines can be corrected by estimating a pixel value for each pixel of the bad line. That is, the value of the bad line pixel can be interpolated by averaging the pixel values of one or more neighboring "good" pixels. For example, where a bad pixel has two neighboring good pixels, the bad pixel value can be substituted with a pixel value equal to the average of the two neighboring good pixels. In this manner, the estimated pixel values can cause the image artifact or the bad lines to diminish or become less noticeable to the human eye.

The interpolation process, however, can affect the statistical property such as the standard deviation or variance of the corrected pixels. That is, because the interpolation process averages the pixel values of one or more pixels the corrected pixels will have a standard deviation that is different from the neighboring good pixels. As a result, certain applications that may rely on pixels having a certain degree of variance, such as peak opacification applications, can be negatively affected by the interpolation process. Accordingly, additional and/or alternative techniques may necessary in order to satisfactorily correct image artifacts or bad pixel lines used in these applications.

BRIEF DESCRIPTION OF THE INVENTION

Certain embodiments of the present technology provide a method for correcting image artifacts on an x-ray image. The method can include the steps of obtaining x-ray images having a plurality of pixels with a pixel value. In some embodiments, the x-ray images comprise one or more bad pixel lines having a plurality of bad pixels. The method can also include the step of processing bad pixel lines with a correction algorithm to generate corrected pixel lines. In certain embodiments, the pixels of the corrected pixel lines have corrected pixel values. The method can also include the step of processing the corrected pixel line with a filtering algorithm to generate filtered pixel lines. In some embodiments, the pixels of the filtered pixel lines have a filtered pixel value. The method can also include generating corrected x-ray images by replacing the bad pixel lines with the filtered pixel lines.

Certain embodiments of the present technology include a system for correcting artifacts on x-ray images. The system can include an image acquisition device configured to obtain x-ray images. In some embodiments, each x-ray image has a plurality of frame pixels with a pixel value. The system can also include a data storage device operable to store x-ray images obtained by the image acquisition device, and a display unit configured to display x-ray images. In some embodiments, the system includes a processing unit that is communicatively coupled to the image acquisition device, the data storage device, and the display unit. The processing unit can be configured to execute a correction application that processes bad pixel lines of x-ray images with a correction algorithm, for example, to generate corrected pixel lines. In some embodiments, the pixels of the corrected pixel lines have a corrected pixel value. The processing unit can also be configured to execute a filtering application that processes the corrected pixels lines, for example, with a filtering algorithm to generate filtered pixel lines. In some embodiments, the pixels of the filtered pixel lines have a filtered pixel value.

Some embodiments of the present technology also provide a non-transitory computer-readable medium encoded with a set of instructions for a computer. The instructions can include a first routine configured to process x-ray images having bad pixel lines with a correction algorithm to generate corrected pixel lines. In some embodiments, the pixels of the corrected pixel lines have a corrected pixel value. The instructions can also include a second routine configured to process the corrected pixel lines with a filtering algorithm to generate filtered pixel line. The pixels of the pixel lines have a filtered pixel value. The instructions can also include a third routine configured to generate corrected x-ray images by replacing the bad pixel lines with the filtered pixel lines.

Figure 1:
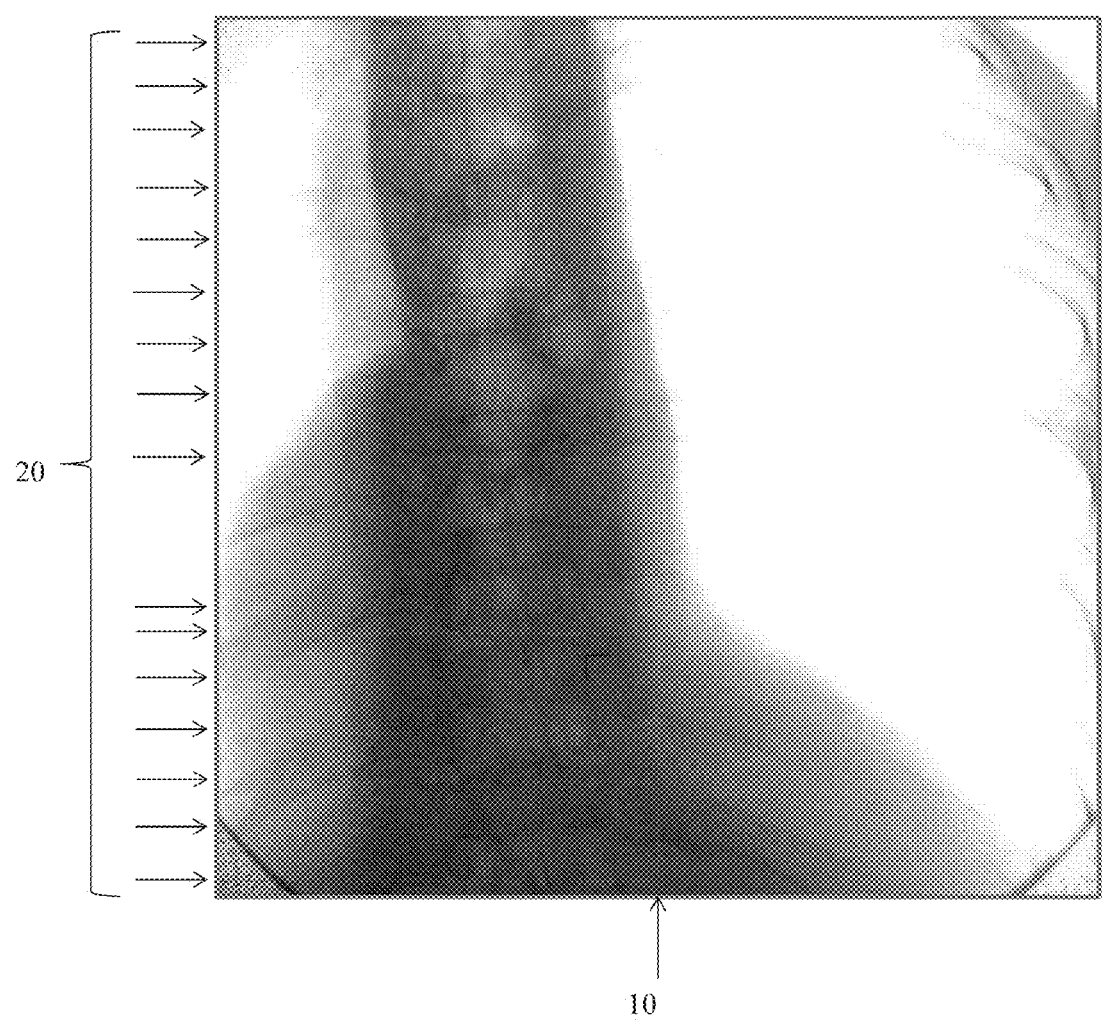
FIG. 1 shows an exemplary x-ray image having bad pixel lines.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

The present technology relates to methods and systems for correcting artifacts in digital images. More specifically, the present technology provides methods and systems that correct bad lines in x-ray images using filtering techniques that preserve the statistical properties of the pixels on the bad line image.

Figure 2:
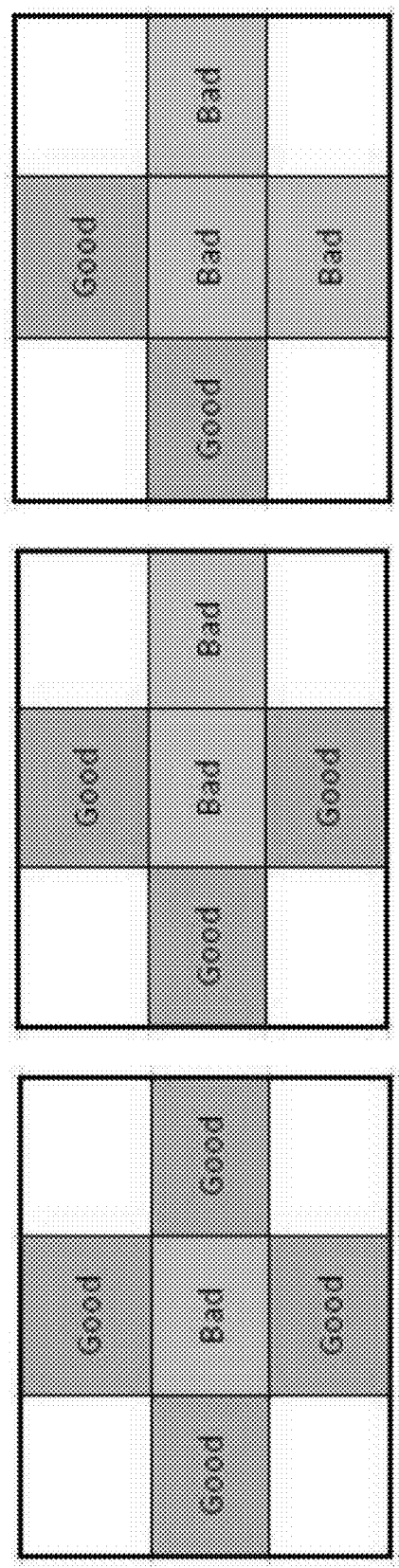
FIG. 2 provides are exemplary diagrams of pixel display formations including good and bad pixels.

Bad lines on x-ray images can be corrected by interpolating a pixel value for each pixel of the bad line. That is, the value of the bad line pixel can be estimated by averaging the pixel values of one or more good neighboring row/column pixel pairs. Depending on the number of good pixels surrounding the bad pixel, the pixel value of the bad pixel can be estimated with greater certainty. For example, FIG. 2 depicts several matrices demonstrating example pixel scenarios.

In FIG. 2A, one bad pixel is surrounded by two pairs of good neighboring row/column pixel pairs. In such a situation, the bad pixel of FIG. 2A can be corrected by applying a correction formula of:

$$\hat{p}_{i,j} = \frac{p_{i-1,j} + p_{i+1,j}}{2} \quad (2)$$

where:
$p_{i,j}$ is the pixel value of a good pixel having pixel coordinates (i,j), and
$\hat{p}$ is the corrected pixel value of the bad pixel.

Applying equation (1), to the bad pixel of FIG. 2A, the bad pixel (having coordinate (i,j)) would take on a corrected pixel value based on the average of the good pixel above it ($p_{i-1,j}$), the pixel below it ($p_{i+1,j}$), the pixel to the left ($p_{i,j-1}$), and the pixel to the right ($p_{i,j+1}$).

The bad pixel of FIG. 2B is surrounded by three good pixels, but only one good neighboring row/column pixel pair. That is, the pixel to the left of the bad pixel does not have a corresponding good neighboring row pixel. Accordingly, in such a situation, the bad pixel of FIG. 2B can be corrected by applying a correction formula:

$$\hat{p}_{i,j} = \frac{p_{i-1,j} + p_{i+1,j}}{2} \quad (2)$$

where:
$p_{i-1,j}$ is the pixel value of the good pixel above the bad pixel, and
$p_{i+1,j}$ is the pixel value of the good pixel below the bad pixel.

Where the bad pixel does not have a good neighboring row/column pixel pair, but has at least one good row-column neighboring pixel, the corrected pixel value can be estimated based simply on one good neighboring pixel. For example, for the bad pixel of FIG. 2C, the bad pixel can be corrected by applying a correction formula:

$$\hat{p}_{i,j} = p_{i-1,j} \quad (3)$$

That is, the bad pixel can simply take on the pixel value of the neighboring pixel to the left, for example.

Figure 3:
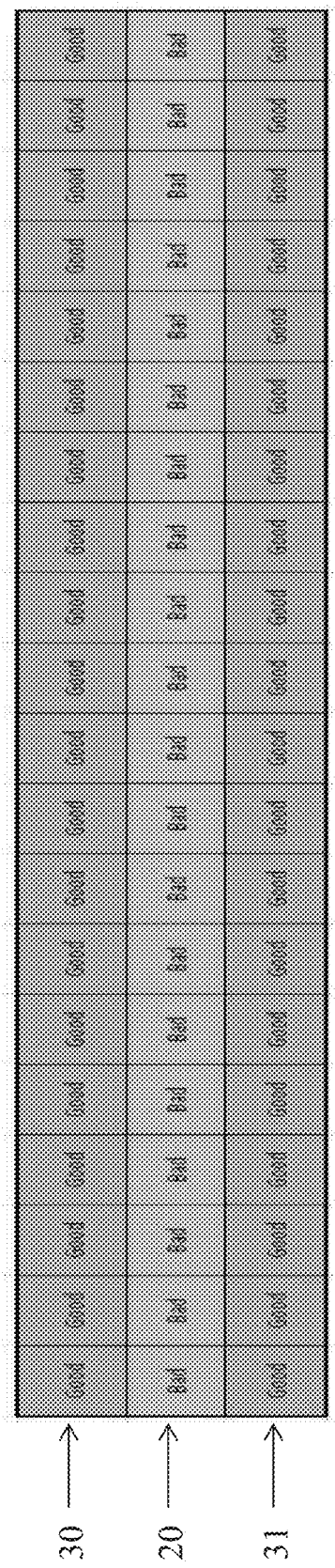
FIG. 3 is an exemplary diagram of three rows of pixels of a digital x-ray image.

Image artifacts frequently result in entire lines of bad pixels, called "bad lines" or "bad pixel lines." Such bad pixel lines can result from x-ray detector equipment defects or issues, or they may occur as a result of the limitations of the x-ray detection equipment. For example, butting gaps of multi-wafer tiling can result in lines of undetectable material, resulting in the bad pixel lines.

Where an x-ray image has a bad pixel line, each bad pixel of the bad line can be corrected by interpolating the values of the pixels of the neighboring good lines. For example, FIG. 3 provides an exemplary diagram of three rows of pixels of a digital x-ray image. A bad pixel row 20, is neighbored by a good pixel row 30 above, and a good pixel row 31 below. In such a situation, each bad pixel of the bad pixel line 20 can be corrected by applying a correction formula:

$$y_{i,j} = \frac{p_{i-1,j} + p_{i+1,j}}{2} \quad (4)$$

where:
$y_{i,j}$ is the corrected pixel value of pixels along the bad pixel line, and
$p_{i-1,j}$ and $p_{i+1,j}$ are the pixel values of the good neighboring pixels above and below the bad pixel, respectively.

This correction of the bad lines by interpolation can affect the statistical property (i.e., standard deviation) of the x-ray image, particularly in the bad line of the x-ray image. For example, the standard deviation of the good pixels of an x-ray image can be represented by $\sigma_G$. However, because the bad line has been corrected by applying an interpolation of multiple pixels, the standard deviation of the corrected bad line pixels is reduced by a factor of the square root of 2. That is, the standard deviation of the corrected pixels can be represented by the formula:

$$\sigma_B = \frac{\sigma_G}{\sqrt{2}} \quad (5)$$

where $\sigma_B$ is the standard deviation of the corrected bad pixels.

Because the interpolation correction process affects the standard deviation of the pixels of the x-ray image, the bad pixel lines can re-appear when applying certain applications to the x-ray images. For example, applying peak opacification to an x-ray image can cause the bad lines to appear. FIG. 1 shows an opacified x-ray image that has bad pixel lines 10 and 20 appearing as "white" lines, or lines that stand out as being lighter than the other pixels of the image.

X-ray opacification is a process used to enhance the blood vessels of a patient with contrast agent. Opacification can be used to generate a single digital x-ray image based on a plurality of x-ray frames.

In operation, opacification can be performed on objects imaged when an opacifier, or a contrast agent, has been introduced to the imaged object. The contrast agent will flow through the object and slowly dilute or wash away after a period of time, typically a short period. During this time, a plurality of x-ray images, or image frames, can be obtained by an x-ray detector (e.g., a flat panel x-ray detector).

Based upon the x-ray image frames, an opacified x-ray image can be generated by a technique called peak opacification. Peak opacification can apply an algorithm to the x-ray images to generate a single opacified x-ray image, where each pixel of the opacified image takes on a pixel value of the darkest pixel among the x-ray image frames.

The opacified image can then be built pixel-by-pixel. For example, for each pixel of the opacified image, the peak opacification algorithm can apply the following formula:

if:

$[y(k) > z(k-1)],$ then:

$$z(k)=z(k-1),$$

else, $$z(k)=y(k); \quad (6)$$

where:
y(k) is the pixel value (i.e., pixel brightness/darkness level) of a pixel at frame k; and
z(k) is the pixel value of the opacified image after analyzing k frames.

That is, for each pixel of the opacified image, the pixel value will be that of the lowest pixel value (i.e., the darkest pixel value) among all pixels sharing a pixel coordinate among the x-ray image frames. This assures that the pixels of the opacified x-ray image have the darkest possible pixel value.

Opacification can be performed to maintain a trace of a contrast agent in opacification or roadmap imaging mode when the contrast agent disappears from a pixel. In order to do so, only the darkest value for every location of an image is kept in peak opacification mode.

Peak opacification applications generate opacified x-ray images by sampling the darkest pixels from a series of x-ray image frames obtained after a contrast agent is applied to the imaged object. The opacification process relies on a certain degree of variance or standard deviation among the pixels of the x-ray image frames. However, because the corrected bad pixels of x-ray images tend to have a lower variance from the good pixels, the interpolation process, by itself, is not a satisfactory way to correct bad lines for opacified x-ray images.

Figure 4:
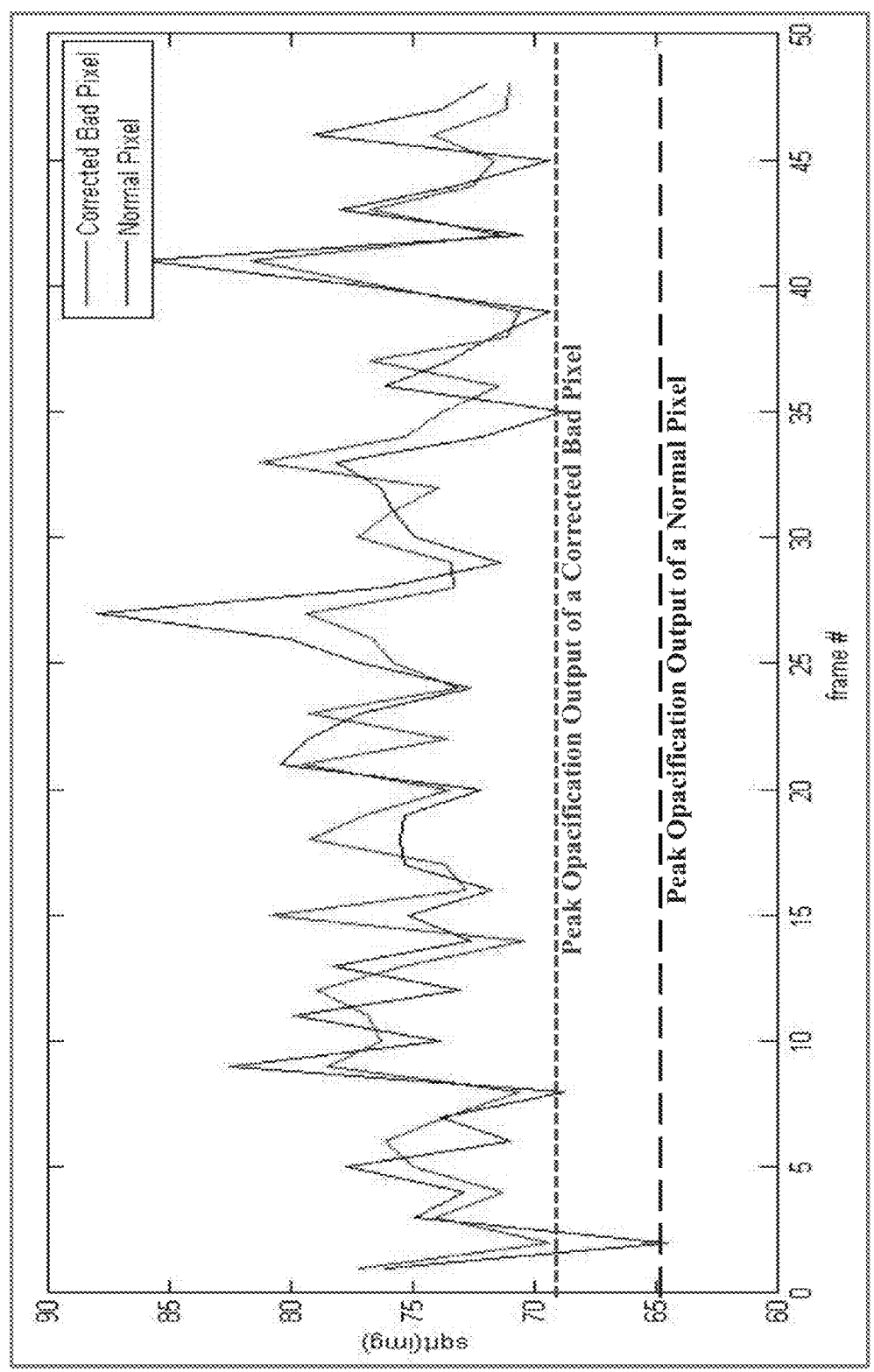
FIG. 4 is a graph depicting the opacification output for a normal pixel versus a corrected pixel across a plurality of x-ray image frames.

FIG. 4 is a graph depicting the opacification output for a normal pixel versus a corrected pixel across a plurality of x-ray image frames. More specifically, the graph of FIG. 4 shows the pixel value of a bad pixel and a good pixel over 50 image frames. As is seen, the good pixel has more variation, or noise. As a result, the darkest value of the normal pixel is lower (i.e., darker) than the bad pixel. Thus the corrected bad pixel line of an opacified x-ray image may appear as a lighter bad pixel line after peak opacification, as demonstrated in FIG. 1.

The reduced noise or statistical property resulting from the interpolation process of correcting bad lines can result in negative effects in other applications besides peak opacification. Accordingly, the present technology provides a solution to correcting the bad pixel lines that occur after peak opacification.

Figure 5:
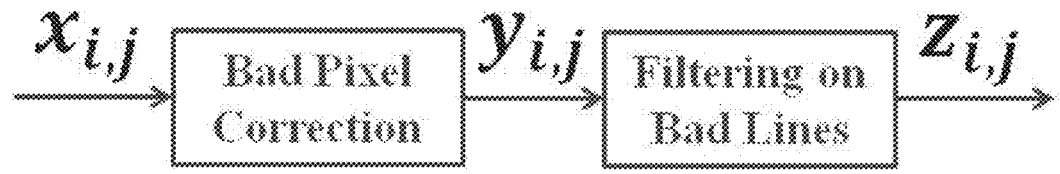
FIG. 5 is a flow diagram of a method for filtering bad pixel lines in an x-ray image in accordance with at least one embodiment of the present technology.

FIG. 5 is a flow diagram of a method for filtering bad pixel lines on an x-ray image in accordance with at least one embodiment of the present technology. As shown in FIG. 5, the present technology provides a method that applies bad pixel correction to a bad pixel (i.e., $x_{i,j}$) in order to obtain a corrected pixel (i.e., $y_{i,j}$), and then, applies a filtering process on the bad lines to obtain a filtered pixel (i.e., $z_{i,j}$).

The present technology applies filtering as a bad line correction approach to restores both the low frequency components and the high frequency components of an x-ray image. That is, the disclosed approach will preserve the statistical property, that is, the standard deviation of the bad lines. More specifically, the present technology applies a filtering algorithm to the pixels of the bad lines of an x-ray image.

To determine the filtering algorithm, let:

$$\{y_{i0,j}, j=0, 1, \ldots, J-1\}$$

represent the pixel values of a bad line that obtained through interpolation:

$$\left\{y_{i0,j} = \frac{x_{i0-1,j} + x_{i0+1,j}}{2}, j = 0, 1, \cdots, J-1\right\}.$$

Assuming that the standard deviation $\sigma_x$ of the two pixels in the original x-ray image is the same, then the standard deviation $\sigma_y$ of the pixels on the bad line after correction is:

$$\sigma_y = \frac{\sigma_x}{\sqrt{2}}.$$

To introduce a filter, let $$\{z_{i0,j} = a \times y_{i0,j} - b \times (y_{i0,j-1} + y_{i0,j+1}), j=1, 2, \ldots J-2\}$$

such that $\{z_{i0,j}\}$ has the same standard deviation as $\{x_{i0,j}\}$. Accordingly, we have:

$$\sigma_z^2 = a^2 \times \sigma_y^2 + b^2 \times (\sigma_y^2 + \sigma_y^2)$$
$$= (a^2 + 2 \times b^2) \times \sigma_y^2$$
$$= (a^2 + 2 \times b^2) \times \frac{\sigma_x^2}{2}$$
$$\equiv \sigma_x^2$$

or: $a^2 + 2 \times b^2 = 2$

To preserve the low frequency property of $\{y_{i0,j}\}$ in $\{z_{i0,j}\}$, the values of the filter coefficients a and b should satisfy the equation:

$$a - 2 \times b = 1$$

Accordingly, resolving the equations $$\begin{cases} a^2 + 2 \times b^2 = 2 \\ a - 2 \times b = 1 \end{cases} \text{ yields } \begin{cases} a = \frac{\sqrt{10}+1}{3} \\ b = \frac{\sqrt{10}-2}{6} \end{cases}$$

Thus, the filtering algorithm can accordingly take the formula:

$$z_{i,j} = a \times y_{i,j} - b \times (y_{i,j-1} + y_{i,j+1}); \quad (7)$$

where:
$y_{i,j}$ is the corrected pixel value of a pixel having a pixel coordinate (i,j);
$z_{i,j}$ is the filtered pixel value of a pixel having a pixel coordinate (i,j);
a is a filter coefficient having a value:

$$a = \frac{\sqrt{10}+1}{3};$$

and
b is a filter coefficient having a value:

$$b = \frac{\sqrt{10}-2}{6};$$

such that pixels having a pixel row coordinate i define a bad pixel line.

It can be seen that a filter with the above coefficients on a bad line will preserve the statistical property (i.e., the variance, or standard deviation) of the pixel values on that line.

Using this filtering algorithm, the present technology can correct bad lines that appear in x-ray images in a manner that preserves the statistical property (e.g., variation, or standard deviation) of the corrected bad lines. In this manner the filtering algorithm generates a filtered pixel value for each bad line pixel based on the corrected pixel value of the bad line pixel, and the corrected pixel value of one or more pixels neighboring the bad line pixel. The filtering algorithm is therefore based at least in part on the pixel variation of the pixels along the bad pixel line.

Certain embodiments of the present technology present methods for correcting image artifacts on an x-ray image. The methods can include, for example, obtaining x-ray images, correcting bad lines in the x-ray images, and performing high-pass filtering on the corrected bad lines to generate corrected x-ray images. Some embodiments of the present technology further include generating opacified x-ray images by applying a peak opacification algorithm to the x-ray images.

Figure 6:
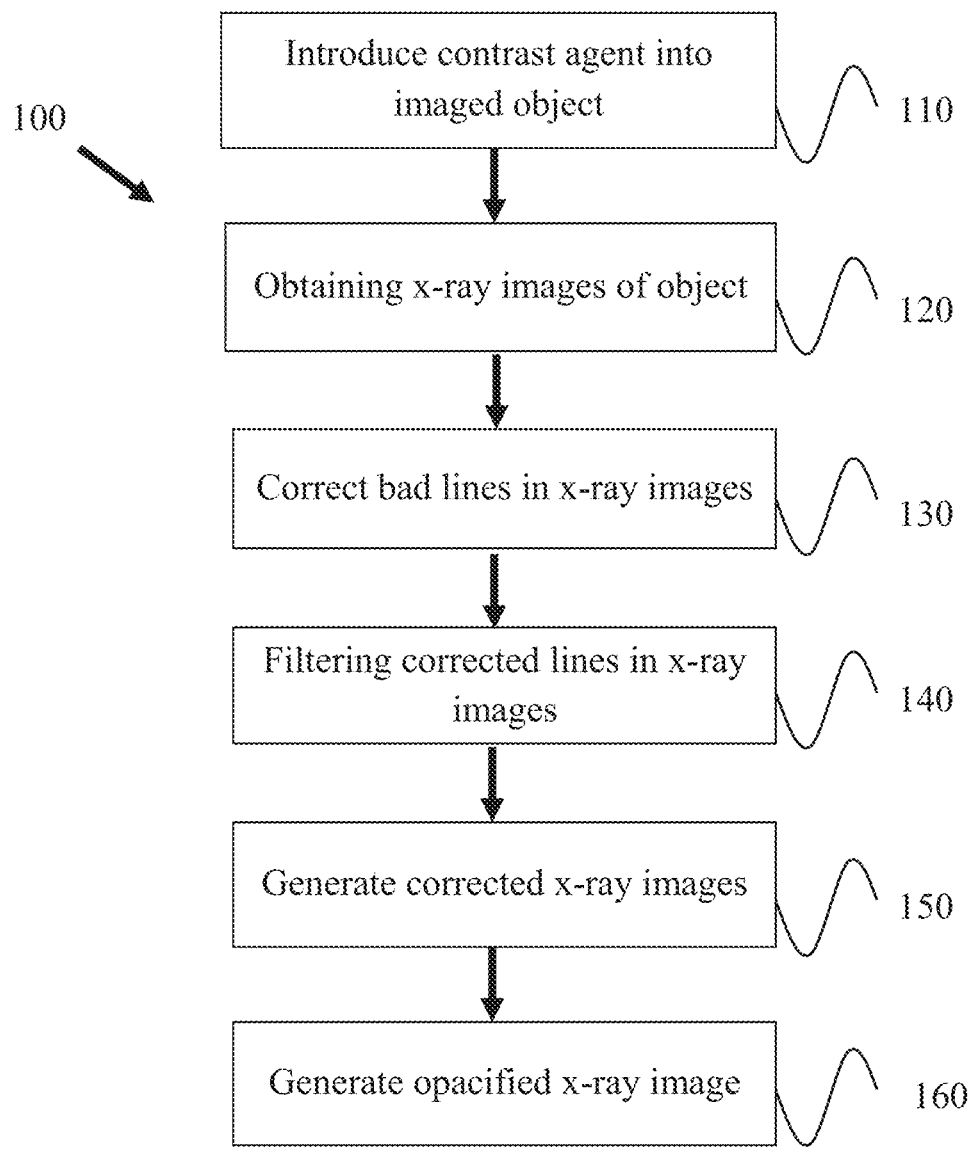
FIG. 6 is a flow diagram of a method for correcting image artifacts on an x-ray image in accordance with at least one embodiment of the present technology.

FIG. 6 is a flow diagram of a method 100 for correcting image artifacts on an x-ray image in accordance with at least one embodiment of the present technology.

In one embodiment of the method 100 includes the step 110 of introducing a contrast agent into an object to be imaged. The contrast agent can be introduced intravenously, for example, into the bloodstream of a patient having the x-ray taken. The contrast agent can be, for example, iodine or other opaque substance designed to yield darker x-ray image frames for a short period of time, before the contrast agent dissipates. It should be noted, however, that not all embodiments of the present technology involve the use of a contrast agent as described in step 110. That is, certain embodiments of the present technology can obtain lighter blood vessels instead of darker ones in x-ray images with contrast agent. Moreover, some embodiments of the present technology can obtain x-ray images without using a contrast agent.

At step 120, a plurality of x-ray images are obtained, for example, using an x-ray imaging device such as a flat panel x-ray detector. In some embodiments, multiple x-ray images or image frames can be obtained as the contrast agent dissipates throughout the imaged object.

At step 130, bad lines in the x-ray image frames are corrected. The bad lines can be corrected using a correction algorithm, for example, as described herein with respect to formulas (1)-(4). In some aspects of the present technology, method step 130 is performed by a computer processor, or a processing unit, for example.

In some embodiments, the bad lines are corrected by interpolating a pixel value for each pixel of the bad line. The bad line pixel values can be interpolated by averaging the pixel value of adjacent or neighboring good pixels. For example, for a horizontal bad pixel line, the pixel value for each bad line pixel can be interpolated by averaging the pixel value of the neighboring row good pixel pair, which can include the pixels immediately above and immediately below the bad pixel. This step can be performed, for example, by a computer processor or processing unit. For example, the computer processor may execute a set of instructions having a routine configured to process x-ray images with a correction algorithm to generate at least one corrected pixel line, the pixels of the at least one corrected pixel line having a corrected pixel value.

At step 140, the corrected lines of the x-ray images are filtered. The filtering can be done by applying a filtering algorithm to the pixels of the corrected lines, for example, as described herein with respect to formula (7). In some embodiments, the filtering algorithm can be performed to introduce or restore the noise or variation of the bad line to the corrected pixel line in the x-ray images. Method step 140 can be performed, for example, by a computer processor, or processing unit.

In some embodiments, the filtered pixel value is based in part on the corrected pixel value of the pixel, and the corrected pixel value of neighboring pixels on the corrected bad line. For example, the filtered pixel value can be the pixel value of the corrected pixel, multiplied by a first filter coefficient (e.g., see filter coefficient a referenced in formula (7)), reduced by a factor that multiplies the sum of the corrected pixel values of the neighboring bad pixels on the bad pixel line by a second filter coefficient (e.g., filter coefficient b referenced in formula (7)). In this manner, the corrected pixels of the corrected pixel lines can be filtered to preserve the statistical variance of the pixels along the corrected pixel line that would otherwise be reduced as a result of the interpolation correction process. In certain embodiments, method step 140 can be performed, for example, by a computer processor or a processing unit. For example, the computer processor may execute a set of instructions having a routine configured to process the corrected pixel lines with a filtering algorithm to generate at least one filtered pixel line, the pixels of the at least one filtered pixel line having a filtered pixel value.

At step 150, corrected x-ray images are generated. The corrected x-ray images can be generated by replacing the bad pixel lines of the original x-ray images with the filtered pixel lines, as derived in step 140. The method step 150 can be performed, for example, by a computer processor, or processing unit. In certain embodiments the corrected x-ray images can be displayed on a display unit, such as a computer screen, for example. In some embodiments, the corrected x-ray images can be stored in a data storage device, for example, in a database of a computer hard drive.

At step 160, the method generates an opacified x-ray image. The opacification can occur by using a peak opacification algorithm, for example, as described herein with respect to the formula (6). In some embodiments, the opacified x-ray image can be generated by processing two or more of the corrected x-ray images obtained via steps 110-150 with a peak opacification algorithm.

The opacified x-ray image can include a plurality of pixels having an opacified pixel value. In certain embodiments, step 160 processes each corrected x-ray image to obtain a darkest pixel value for each pixel of the opacified x-ray image. That is, each pixel of the x-ray image can take on the pixel value of the darkest pixel having the same pixel coordinate among all the x-ray image frames. In certain embodiments, method step 160 can be performed, for example, by a computer processor or a processing unit. For example, the computer processor may execute a set of instructions having a routine configured to process a plurality of corrected x-ray images or image frames with a peak opacification algorithm to generate an opacified x-ray image. It should be noted, however, that not all embodiments of the present technology involve the generation of an opacified image as described in step 110. That is, certain embodiments of the present technology can obtain x-ray images that are not used to generate an opacified x-ray image.

Figure 7:
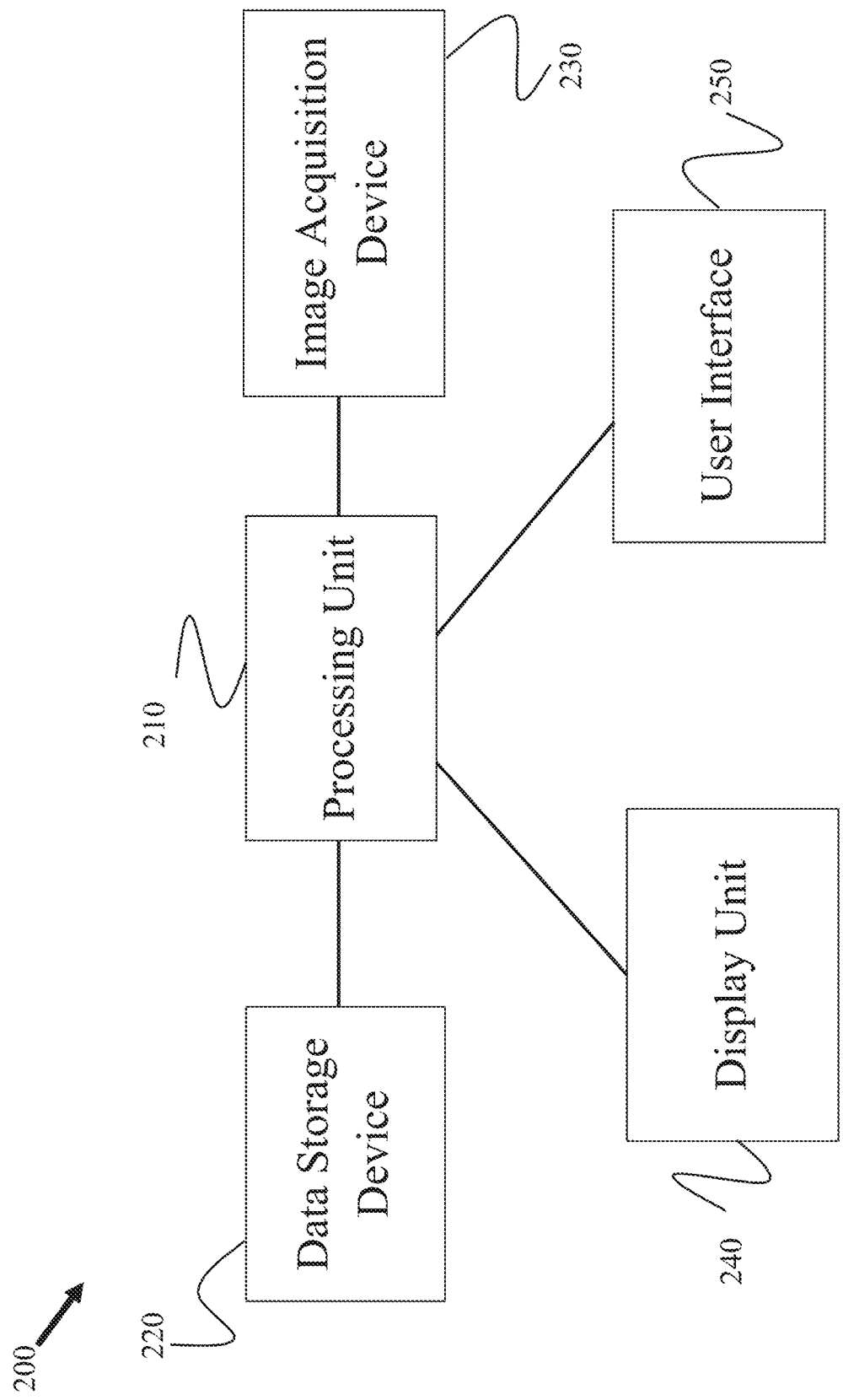
FIG. 7 is a block diagram of a system for correcting image artifacts on an x-ray image in accordance with at least one embodiment of the present technology.

Certain embodiments of the present technology provide a system for correcting artifacts on x-ray images, and for correcting bad lines while preserving the statistical properties of the lines. FIG. 7 is a block diagram of a system 200 for correcting image artifacts on an x-ray image.

In some embodiments, the system 200 can comprise a computer, or a processing unit 210. The processing unit can include, or be in communication with a data storage device 220, an image acquisition device 230, a display unit 240, and a user interface 250, for example. In this manner, the system 200 can be used to obtain x-ray images, process the x-ray images (e.g., process the images to correct and filter bad pixel lines and/or to generate opacified x-ray images), display the x-ray images on the display unit 240, and store the x-ray images in the data storage device 220.

The data storage device 220 can be a hard drive, a network or cloud, or a remote storage device such as a flash drive. The data storage device 220 can store or maintain a database. In certain embodiments, the data database is operable to store x-ray images. Each x-ray image can include a plurality of pixels having a pixel value. The pixels can also have a pixel coordinate that identifies a location or reference point of the pixel.

The image acquisition device 230 can be an x-ray detector. For example, the image acquisition device 230 can be a C-arm x-ray system, a flat panel x-ray system, or the like. The image acquisition device 230 can be configured to obtain a plurality of x-ray images. In some embodiments, the image acquisition device 230 can be configured to obtain multiple x-ray image frames of an object after a contrast agent has been introduced to the object. In some embodiments, the image acquisition device 230 can communicate with the processing unit 210, to correct the bad pixel lines on the x-ray images. For example, the image acquisition device 230 and/or the processing unit 210 can process the x-ray images with a correction algorithm, such as described in formulas (1)-(4), in accordance with the present technology.

The display unit 240 can be a monitor or other device for displaying digital images, including x-ray images. For example, the display unit 240 can be a monitor connected to one or more of the processing unit 210, the data storage device 220, and the image acquisition device 230 and used to visually display the x-ray image. The display unit 240 can comprise a matrix of pixels so that each pixel of the x-ray image is displayed at a pixel value (i.e., brightness/darkness) level corresponding to the pixel values of the x-ray images. The display unit 240 can display images stored within the data storage device 220, or images as they are acquired by the image acquisition device 230, for example.

Certain embodiments of the system 200 also include a user interface 250 that can be used to control, manage, and execute functionality of the system 200. For example, the user interface can be a program or application executed by the processing unit 210 that allows a user to interact and control with the components of the system 200, such as the data storage device 220, the processing unit 210, and the image acquisition device 230. For example, using the user interface 250, a user may be able to execute applications that obtain one or more x-ray images, store the images in the data storage device 220, and process the x-ray images to obtain corrected x-ray images, opacified x-ray images, and the like.

In some embodiments, the processing unit 210 is configured to execute a number of applications, programs, and/or routines. For example, in some embodiments, the processing unit 210 can execute an image acquisition application to obtain x-ray images. In some embodiments, the processing unit 210 can execute correction applications and/or correction algorithms to correct artifacts and/or bad pixel lines in the x-ray images. In certain aspects, the correction applications and/or algorithms generate a corrected pixel value for each bad pixel of the bad pixel lines, so that the corrected pixel values are based on an average of the frame pixel values of one or more frame pixels neighboring the bad frame pixel. For example, in some embodiments, the correction applications and/or algorithms apply the formulas described herein (e.g., formula (4)) to bad pixel lines to generate a corrected pixel line having pixels with a corrected pixel value.

In certain embodiments, the processing unit 210 executes a filtering application that generates a corrected x-ray image by processing the corrected pixels of the corrected pixel line with a filtering algorithm. For example, the filter application and/or algorithm can generate a filtered pixel value for each corrected pixel on the corrected pixel line, and substituting the corrected pixel values with the filtered pixel values for each bad line pixel. In some embodiments, the processing unit 210 can execute a routine that filters the corrected pixel line of the x-ray image using the formulas and methods described herein, (e.g., with respect to formula (7)). In certain embodiments, the filter application and/or the filtering algorithm can be configured to generate the filtered pixel value for each pixel based on the corrected pixel value of pixel, and the corrected value of one or more pixels neighboring the pixel. In some aspects, the filtered pixel value can be based at least in part on the pixel variation, or statistical property, of the pixels along the bad pixel line. That is, the filtered pixel line can be provided to preserve the statistical properties of the original image.

In certain aspects of the present technology, the processing unit 210 can also executes an opacification application that generates an opacified x-ray image. For example, the processing unit 210 can generate an opacified x-ray image by processing a plurality of corrected x-ray images with a peak opacification algorithm. In certain aspects, the peak opacification algorithm generates an opacified pixel value for each pixel of the opacified image. For example, the opacified pixel value can be based on the darkest frame pixel value of all frame pixels sharing a frame pixel coordinate among the plurality of x-ray image frames. In some embodiments, the opacification algorithm can apply the formulas described herein (e.g., formula (6)). It should be noted, however, that not all embodiments of the present technology involve the generation of an opacified image. That is, certain embodiments of the present technology can obtain x-ray images, and correct and then filter the bad lines of those images without using the images to generate an opacified x-ray image.

In some embodiments, the processing unit 210 can execute one or more of the method steps of method 100, as described herein with respect to FIG. 6.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for correcting image artifacts on an x-ray image, the method comprising the steps of:
    obtaining at least one x-ray image having a plurality of pixels, the at least one x-ray image comprising at least one bad pixel line having a plurality of bad pixels;

processing at least one bad pixel line with a correction algorithm to generate at least one corrected pixel line, the pixels of the at least one corrected pixel line having a corrected pixel value;

processing the at least one corrected pixel line with a filtering algorithm to generate at least one filtered pixel line, the pixels of the at least one filtered pixel line having a filtered pixel value, the filtering algorithm configured to preserve a statistical property of the pixels along the at least one bad pixel line; and generating at least one corrected x-ray image by replacing the bad pixel lines with the filtered pixel lines.

2. The method of claim 1, wherein the correction algorithm generates the corrected pixel values for each pixel based on an average of the pixel values of one or more good pixels neighboring the bad pixel.

3. The method of claim 2, wherein the filtering algorithm generates the filtered pixel values for each bad pixel based on the corrected pixel value of the bad pixel, and the corrected pixel value of one or more pixels neighboring the bad pixel on the bad pixel line.

4. The method of claim 3, wherein the two good pixels neighboring the bad pixel form at least one of a row pixel pair or a column pixel pair.

5. The method of claim 2, wherein the correction algorithm generates the corrected pixel values for each pixel based on an average pixel value of two good pixels neighboring the bad pixel.

6. The method of claim 1, wherein the correction algorithm is of the general formula:

$$y_{i,j} = \frac{p_{i-1,j} + p_{i+1,j}}{2};$$

where:

$y_{i,j}$ is the corrected pixel value of a pixel having a pixel coordinate (i,j), and $p_{i-1,j}$ and $p_{i+1,j}$ are pixel values of good pixels neighboring the bad pixels of the bad pixel line;

wherein pixels having a first pixel coordinate i define a bad pixel line.

7. The method of claim 6, wherein the filtering algorithm is of the general formula:

$$z_{i,j} = a \times y_{i,j} - b \times (y_{i,j-1} + y_{i,j+1});$$

where:

$y_{i,j}$ is the corrected pixel value of a pixel having a pixel coordinate (i,j);

$z_{i,j}$ is the filtered pixel value of a pixel having a pixel coordinate (i,j); and a and b are filter coefficients selected to preserve the statistical properties of the bad pixel line.

8. The method of claim 7, wherein the filter coefficient a has a value:

$$a = \frac{\sqrt{10} + 1}{3};$$

and wherein the filter coefficient b has a value:

$$b = \frac{\sqrt{10} - 2}{6}.$$

9. The method of claim 8, wherein a value of $z_{i,j}$ defaults to zero if the filtering algorithm results in $z_{i,j}$ being less than zero.

10. The method of claim 1, further comprising the step of generating an opacified x-ray image by processing a plurality of x-ray images with a peak opacification algorithm.

11. The method of claim 10, wherein the peak opacification algorithm generates an opacified pixel value for each pixel of the opacified x-ray image, wherein the opacified pixel value is based on at least one of the darkest or brightest pixel value of all pixels sharing a pixel coordinate among a plurality of corrected x-ray images.

12. A system for correcting artifacts on x-ray images, the system comprising:

an image acquisition device configured to obtain x-ray images, each x-ray image having a plurality of pixels;

a data storage device operable to store x-ray images obtained by the image acquisition device;

a display unit configured to display x-ray images; and a processing unit communicatively coupled to the image acquisition device, the data storage device, and the display unit, the processing unit configured to:

execute a correction application that processes bad pixel lines of the x-ray images with a correction algorithm to generate corrected pixel lines, the pixels of the corrected pixel lines having a corrected pixel value;

execute a filtering application that processes the corrected pixels lines with a filtering algorithm to generate filtered pixel lines, the pixels of the filtered pixel lines having a filtered pixel value, the filtering algorithm configured to preserve a statistical property of the pixels along the bad pixel lines.

13. The system of claim 12, wherein the correction algorithm is of the general formula:

$$y_{i,j} = \frac{p_{i-1,j} + p_{i+1,j}}{2};$$

where:

$y_{i,j}$ is the corrected pixel value of a pixel having a pixel coordinate (i,j), and $p_{i-1,j}$ and $p_{i+1,j}$ are pixel values of good pixels neighboring the bad pixels on the bad pixel line; and wherein pixels having a first pixel coordinate i define a bad pixel line.

14. The system of claim 13, wherein the filtering algorithm generates the filtered pixel based on the general formula:

$$z_{i,j} = a \times y_{i,j} - b \times (y_{i,j-1} + y_{i,j+1});$$

where:

$y_{i,j}$ is the corrected pixel value of a pixel having a pixel coordinate (i,j);

$z_{i,j}$ is the filtered pixel value of a pixel having a pixel coordinate (i,j);

a is a filter coefficient having a value:

$$a = \frac{\sqrt{10}+1}{3};$$

and b is a filter coefficient having a value:

$$b = \frac{\sqrt{10}-2}{6}.$$

15. The system of claim 14, wherein a value of $z_{i,j}$ defaults to zero if the filtering algorithm results in $z_{i,j}$ being less than zero.

16. The system of claim 12, wherein the processing unit is further configured to execute an opacification application that generates an opacified x-ray image by processing a plurality of corrected x-ray images with a peak opacification algorithm.

17. The system of claim 16, wherein the peak opacification algorithm generates an opacified pixel value for each pixel of the opacified image, wherein the opacified pixel value is based on at least one of the darkest or brightest pixel value of all pixels sharing a pixel coordinate among the plurality of corrected x-ray images.

18. A non-transitory computer-readable medium encoded with a set of instructions for a computer, the instructions comprising:
 a first routine configured to process x-ray images having bad pixel lines with a correction algorithm to generate at least one corrected pixel line, the pixels of the at least one corrected pixel line having a corrected pixel value;
 a second routine configured to process the corrected pixel lines with a filtering algorithm to generate at least one filtered pixel line, the pixels of the at least one filtered pixel line having a filtered pixel value, the filtering algorithm configured to preserve a statistical property of the pixels along the bad pixel lines; and
 a third routine configured to generate corrected x-ray images by replacing the bad pixel lines with the filtered pixel lines.

* * * * *